United States Patent
Sauer

(10) Patent No.: US 8,446,038 B2
(45) Date of Patent: May 21, 2013

(54) ENERGY HARVESTING RESISTOR

(76) Inventor: Don Roy Sauer, San Jose, CA (US)

( * ) Notice: Subject to any disclaimer, the term of this patent is extended or adjusted under 35 U.S.C. 154(b) by 431 days.

(21) Appl. No.: 12/879,890

(22) Filed: Sep. 10, 2010

(65) Prior Publication Data

US 2012/0062032 A1    Mar. 15, 2012

(51) Int. Cl.
*H02J 1/10*    (2006.01)

(52) U.S. Cl.
USPC .......................................................... 307/43

(58) Field of Classification Search
USPC ................................ 307/43, 80, 86; 323/282
See application file for complete search history.

(56) References Cited

U.S. PATENT DOCUMENTS

| | | | |
|---|---|---|---|
| 5,218,315 A | 6/1993 | Turner | |
| 5,233,509 A | 8/1993 | Ghotbi | |
| 5,552,643 A | 9/1996 | Morgan | |
| 5,568,044 A | 10/1996 | Bittner | |
| 6,825,644 B2 | 11/2004 | Kernahan | |
| 7,149,097 B1 | 12/2006 | Shteynberg | |
| 7,239,118 B2 | 7/2007 | Halberstadt | |
| 2009/0183934 A1* | 7/2009 | Oyobe et al. | 180/65.265 |

\* cited by examiner

*Primary Examiner* — Carlos Amaya

(57) ABSTRACT

The harvesting Resistor consists of single or dual supply DC to DC converter, which has a current sense resistor in series with its output port. The sensed current magnitude is coupled back to modulate the duty cycle in a way such that a voltage to current together with the power absorbing relationship of a resistor is appearing at the DC to DC converter's output port. Such an emulated resistor, when connected to an external power source, can efficiently transfer the absorbed energy from an external power source to the single or dual supplies of the DC to DC converter.

4 Claims, 6 Drawing Sheets

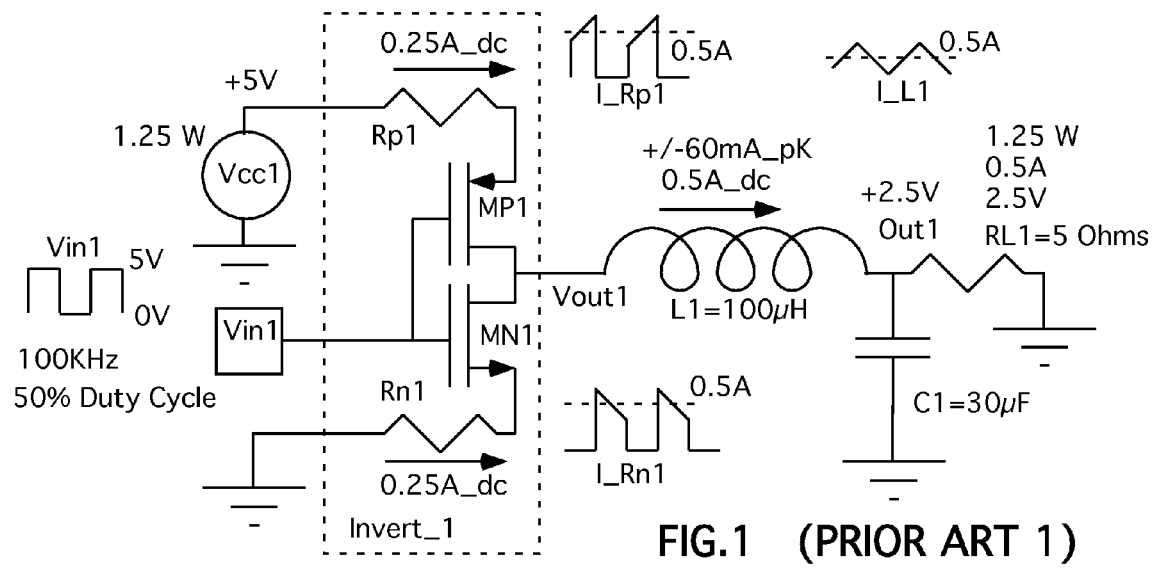
FIG. 1 (PRIOR ART 1)
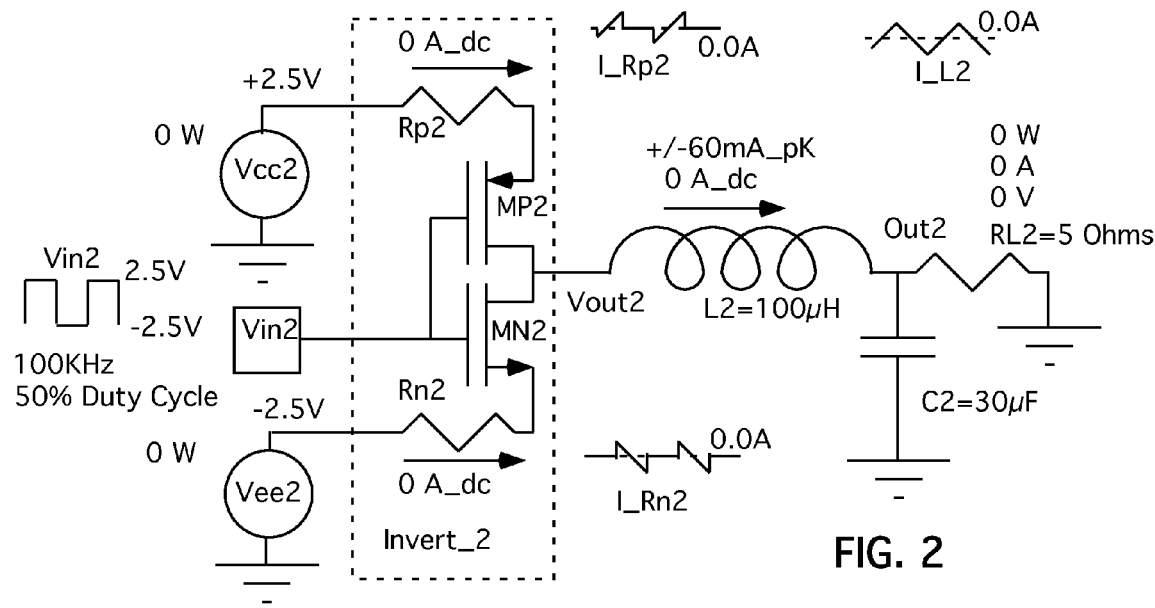
FIG. 2

Voltage and Power for a 50Hz SineWave

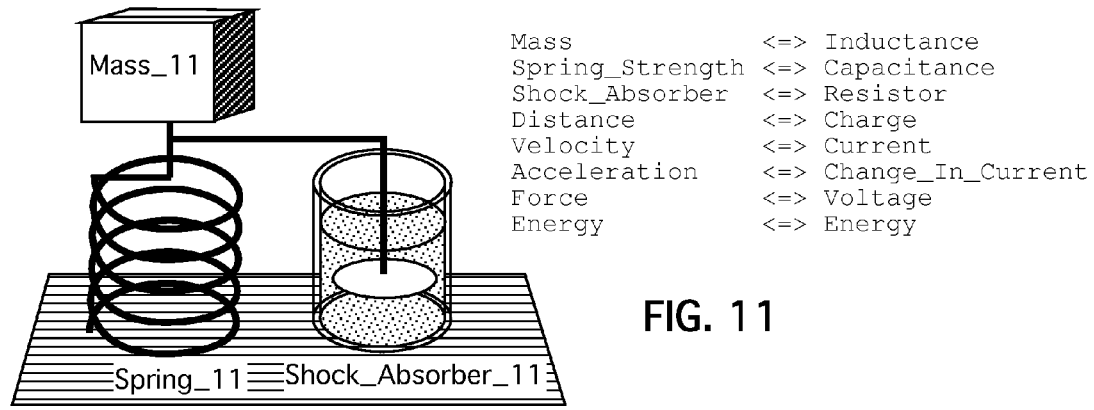
FIG. 11
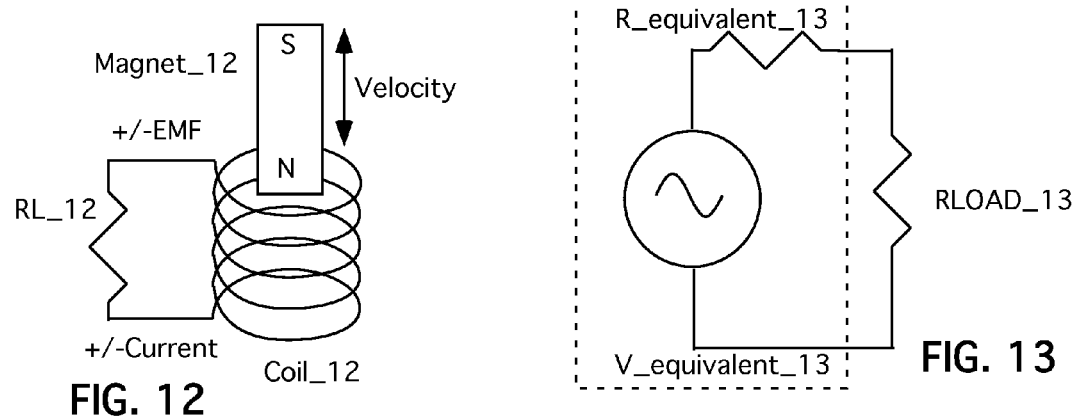
FIG. 12
FIG. 13
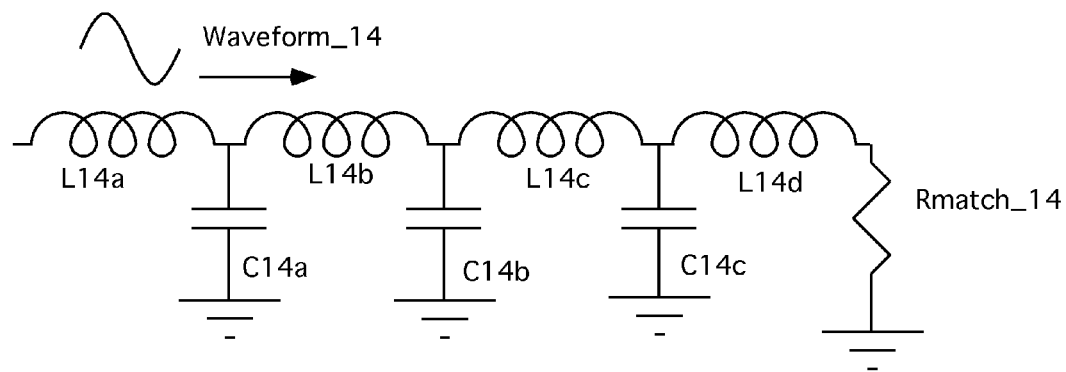
FIG. 14

ENERGY HARVESTING RESISTOR

FIELD OF THE INVENTION

This invention relates to using a DC to DC convertor architecture in a backward fashion with the further addition of providing the means to sense output current in order to adjust the duty cycle. The result is that what is normally used as a DC to DC convertor's output port, has the voltage to current and power absorbing characteristics of a simple resistor. When an external power source of unknown magnitude, polarity, or shape of waveform is applied to this emulated resistor, the energy that gets absorbed instead gets transferred with high efficiency to the DC to DC convertor's supplies.

BACKGROUND

The historical way to capture DC power from an AC source is shown in FIG. 10. The normal residential alternating voltage AC_10 gets transformed down to a lower alternating voltage AC_10b. Diode_10 will peak detect off of AC_10b to charge up capacitor Cfilter_10. Resistor RLOAD_10 represents the circuit being powered up. RLOAD_10 causes the voltage VDC_10, which is across Cfilter_10, to drop slightly until the next time Diode_10 turns on.

The key point to FIG. 10 is that the harvesting of power off of AC_10 is both nonlinear and non consistent. But if the power source AC_10 is consistent in magnitude, frequency, polarity, and shape, then this method causes few problems.

This invention harvests power in a much different way in that the input waveform's characteristics in terms of magnitude, polarity, shape, or up to some limitations frequency, are not critical. And since it works like a resistor, it can be used in dampening and characteristic impedance terminal matching applications.

BRIEF SUMMARY OF THE INVENTION

This invention provides a way to harvest energy with the voltage to current and power absorbing relationships of a simple resistor. The difference is that power that normally gets dissipated in a resistor will get harvested at high efficiency to the powers supplies instead. This resistance relationship has further applications in dampening mechanical systems, and also providing for good characteristic impedance matching to natural energy waveform sources.

BRIEF DESCRIPTION OF THE DRAWINGS

Non-limiting and non-exhaustive embodiments are described with reference to the following drawings:

FIG. 1 illustrates a prior art DC to DC convertor running off of the single supply VCC1.

FIG. 2 illustrates the circuit of FIG. 1 having the dual supplies of VCC2 and VEE2.

FIG. 11 illustrates how a mechanical system consisting of the mass object MASS_11, the spring object Spring_11, and the shock absorber object Shock_Absorber_11 correspond to a critically damped LRC tuned circuit.

FIG. 12 illustrates how the magnet object Magnet_12, the coil object Coil_12, and the resistor object RL_12 can perform the same mechanical function as the shock absorber object Shock_Absorber_11 shown in FIG. 11.

FIG. 13 illustrates how the maximum power from a power source object V_equivalent, can be extracted by making the output load resistor RLOAD_13 match the equivalent impedance R_equivalent of the power source.

FIG. 14 illustrates how the use of a harvesting resistor for Rmatch_14 can match the characteristic impedances of Natural Power Waveforms to fully capture waveform energy.

DETAILED DESCRIPTION OF THE PREFERRED EMBODIMENT

Figure 3:
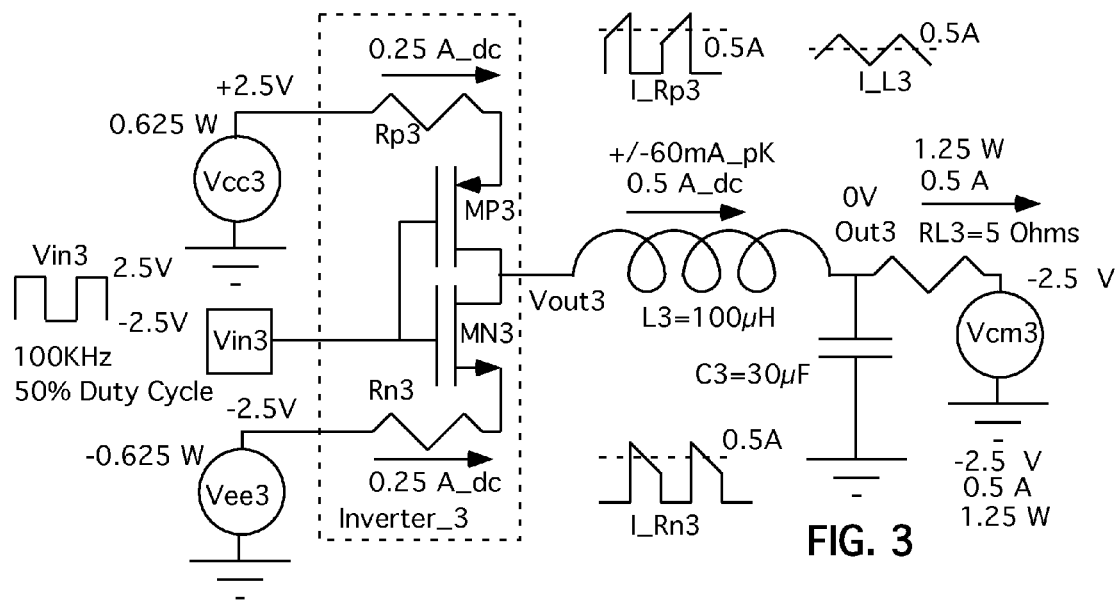
FIG. 3 illustrates how the circuit of FIG. 2 can transfer energy from VCC3 to VEE3.

FIG. 1 shows a common DC to DC convertor circuit which consists of a CMOS inverter Invert_1, driving an inductor L1, into a capacitor C1, to deliver a voltage Out1, across a load resistor RL1. The inverter needs to have both its NMOS transistor MN1 and its PMOS transistor PN1 to be very large such that the CMOS "ON" resistance is very low. The power efficiency of a DC to DC converter approaches 100% when the effective channel resistances of Rp1 and Rn1 are small compared to the output load resistor. The supply Vcc1 is set to 5 Volts. For the sake of simplifying calculations, the resistances will all be modeled at zero.

When a square wave is applied to the input of the invert_1, the output voltage Out1 will approach 2.5 Volts. The LRC network at the output of invert_1 is just a low-pass filter. Ideally, power is only being dissipated by the load resistor RL1. Transistor MP1 and MN1 are acting just like switches. Without any "On" resistance, these transistor dissipate no power when either on or off. Their power depends on having both drain current flow at the same time that there is some source drain voltage. These transistors act more like small resisters that dissipate power based upon current and its resulting IR drop.

The inductor L1 is seeing an almost constant 2.5V dc value on one end, and a 0 to 5 volt square wave on the other end. The inductor will have an AC current at a +/−60 uA peak value, because any voltage across an inductor will ramp up or down its current. The inductor also has a 500 mA DC current, because it is supplying the current to load resistor RL1. The inverter is acting like a 50% multiplexer to the inductor's dc current. Fifty percent of the time, the inductor's dc current comes out of VCC. The AC current of the inductor averages out to zero over this time. So a net DC current of 250 mA gets pulled out of VCC. This means VCC is being discharged by 1.25 W. Load resistor RL1 in the mean time is dissipating the same amount. While there will always be IR drop in real circuits, real world power efficiency for converting a 5 volt supply into a 2.5 volt supply can be in the high ninety percent range.

The inductor's 500 mA DC current is also being 50% multiplexed to ground. This will dissipate very little energy.

But the inductor is acting like a current pump. Inductors cannot change their current very fast. However the voltage across an inductor can change instantaneously to keep its current constant. With time, the inductor will change is current. But this AC current always averages out to zero over time. This is especially true for the current that gets multiplexed to either VCC1 or ground. Only the DC current flowing in the inductor needs to be considered.

So output voltage Out1, which is across RL1 in FIG. 1, can be thought of as a DC voltage. Any DC current that flows through RL1 also flows through L1 as a DC current. And the inverter invert_1 multiplexes that DC current between VCC1 and ground.

FIG. 2 is showing a dual supply version of FIG. 1. The input to invert_2 now needs to swing between both the positive and negative supplies. The output load resistor RL2 still goes to ground. The 50% duty cycle puts the output at zero volts. Now zero DC current flows through RL2. Zero DC current is flowing through L2. And neither VCC2 nor VEE2 are discharging any power. And the AC currents of L2 are averaging out.

A common mode voltage VCM3 has been added to FIG. 3. Now a −2.5V across RL3 can be applied to such that it draws 500 mA, same as it did in FIG. 1. But the other side of RL3 is still at 0 volts. But now 500 mA of DC current is flowing through L3. The 50% duty cycle is multiplexing this current equally between VCC3 and VEE3. For VCC3, pulling current out of a +2.5V battery is discharging it. So it is being discharge at 625 mW. But half of L3's 500 mA dc current is also being pull out of the negative end of VEE3. Pulling current out of the negative end of a battery is actually charging it. So VCC3 is being discharge at a 625 mW rate and VEE3 is being discharged at a −625 mW. So the net power loss for both VCC3 and VEE3 is zero. Power is simply being transferred from VCC3 to VEE3.

In FIG. 3, only resistor RL3 and voltage VCM3 are drawing any power. One end of RL3 looks like it is going to ground and the other VCM3. So the 1.25 W that is being dissipated by RL3 is all coming from VCM3. The rest of the circuit is not really dissipating any power. It is just rearranging power between VCC3 and VEE3.

Now if one end of RL3 goes to VEE3 instead of VCM3, then resistor RL3 would add a +1.25 W of dissipation to VEE3's already −625 mW being dissipated, to yield a total dissipation for VEE3 of +625 mW, same as for VCC3. Then the total power of VCC3 in series with VEE3 together would be 1.25 W, just like in VCC1 in FIG. 1.

Figure 4:
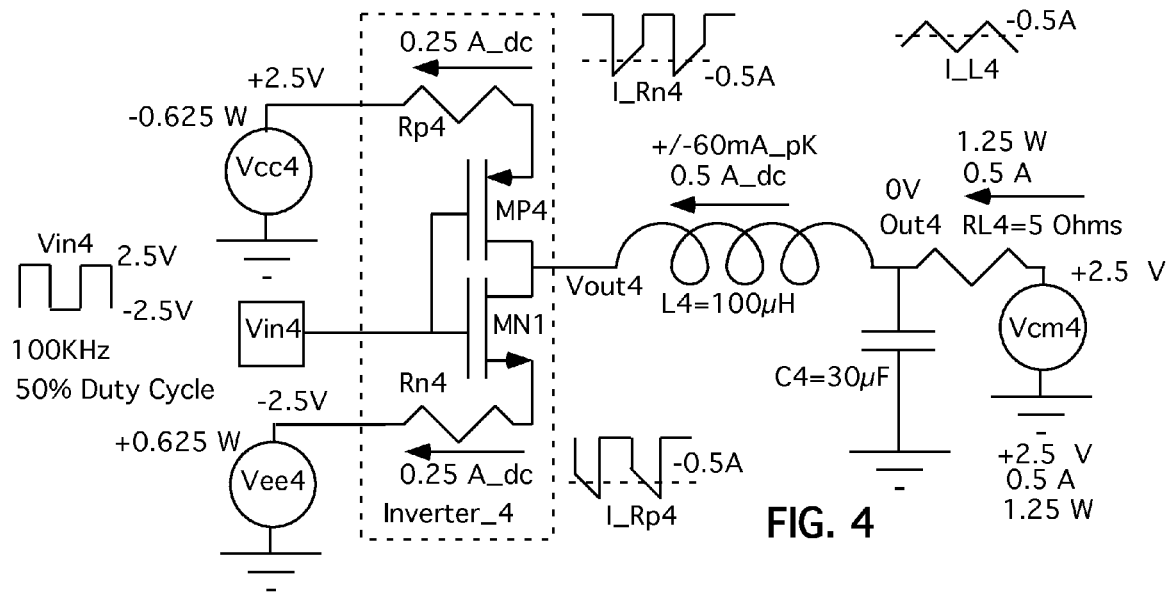
FIG. 4 illustrates how the circuit of FIG. 2 can transfer energy from VEE4 to VEE4.

FIG. 4 shows the same hold true for current in the opposite direction. In this case power is being transferred from VEE4 to VCC4.

Figure 5:
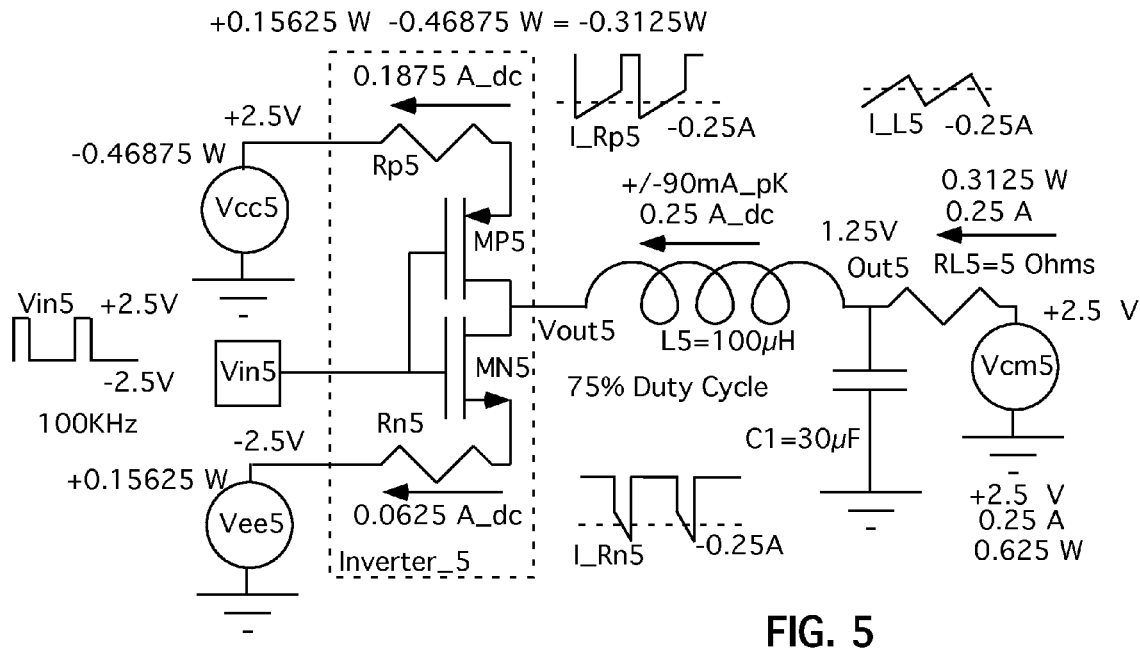
FIG. 5 illustrates how the circuit of FIG. 3 can operate like a 5 Ohm resistor.

FIG. 5 is like FIG. 4 with the duty cycle changed from 50% to 75%. Now one end of RL5 sees +2.5V, and the other end see 1.25V. So now L5 sees a dc current of 250 mA. But the duty cycle is now 75%. So most of that DC current is going in to charge up VCC5 by 469 mW, and VEE5 is being discharged by 156 mW.

Resistor RL5 sees 1.25V across it, and is dissipating 312 mW. VCM5 is drawing 250 mA and being drained by 625 mW. The inductor, inverter and two supplies are receiving 250 mA of current from RL5. They are producing +1.25V in return. The V to I relationship is that of a 5 Ohm resistor. And the net discharge rate of both VCC5 and VEE5 together is −312 mW. Of the 625 mW of power coming out of VCM5, half of it is being dissipated as heat by RL5, and the other half is being supplied to the VCC5 and VEE5. The DC to DC convertor's output port is acting like a 5 Ohm resistor. Except that it is harvesting to its supplies the power that a normal 5 Ohm resistor would otherwise dissipate as heat.

Figure 6:
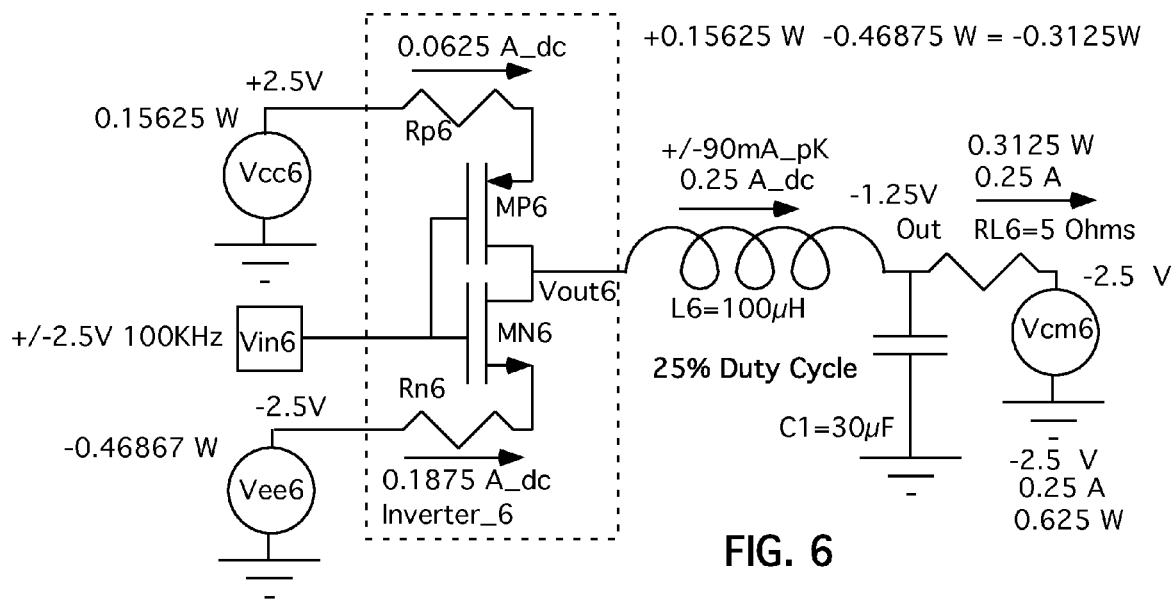
FIG. 6 illustrates how the circuit of FIG. 4 can operate like a 5 Ohm resistor.

FIG. 6 show that changing the direction of the L6's DC current and that changing the duly cycle to 25% still produces a V to I relationship of 5 Ohms, with the same harvesting of power. Now VEE6 is harvesting most of the power.

Figure 7:
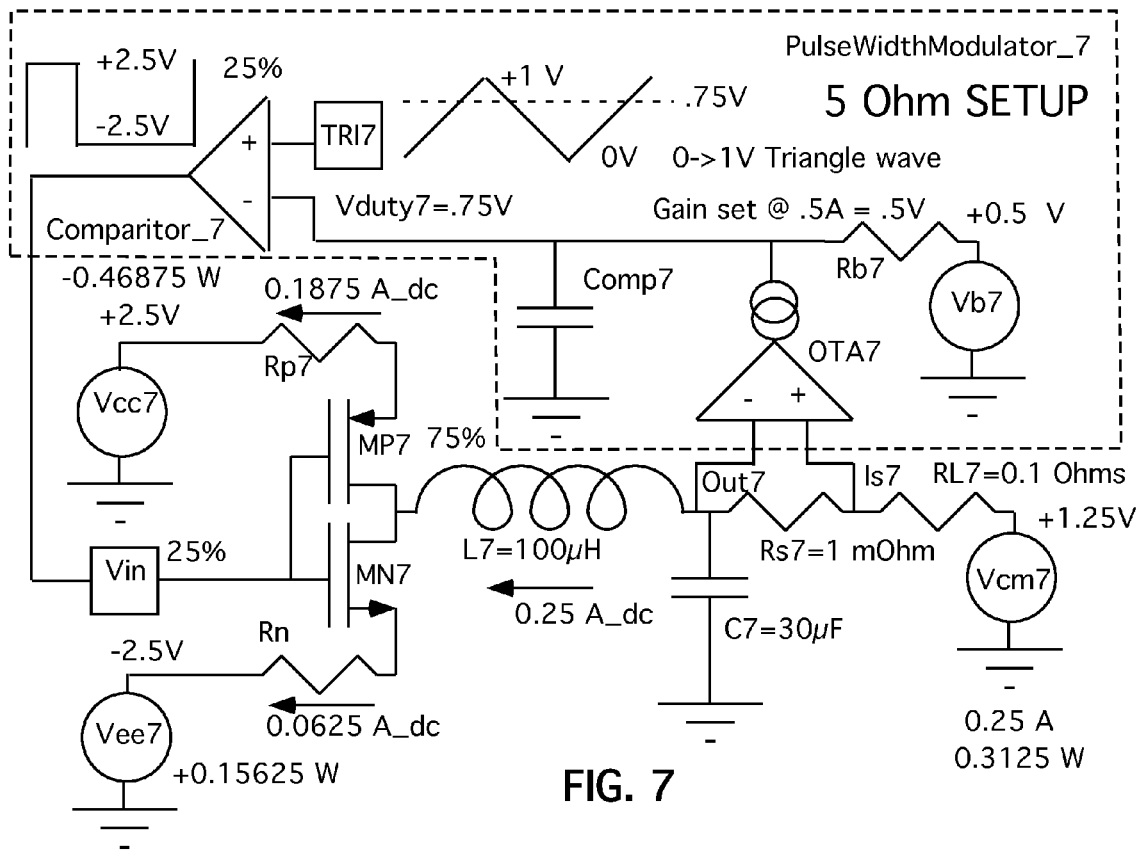
FIG. 7 illustrates the invention in which the sensed output current is coupled back to adjust the duty cycle to generate a 5 Ohm voltage to current relationship at the output.

The invention simply consists of monitoring output current, and adjusting the duty cycle of a DC to DC convertor to produce an output voltage to current relationship of a simple resistor. What is normally used as a power output port, is in this case being used as a power input port instead. The power flow is apparently efficient in both directions. The PulseWidthModulator_7 circuit of FIG. 7 is designed to start off at 50% duty cycle, and then read the voltage across current sense resistor RS7 to detect incoming current.

The schematic of PulseWidthModulator_7 is a simple behavioral model. A zero to one volt 100 KHz triangle wave is fed to one input of comparator_7. The other input sees the voltage Vduty7, which can be raised or lowered. Gain of OTA7, together with the value of Rb7, and the IR drop across RS7, are adjusted to produce an offset of 500 mV when 500 mA flow thru L7. So when 500 mA flows into L7, the duty cycle will be 100%. The output voltage is then 2.5, and the V to I relationship is that of 5 Ohms.

Figure 8:
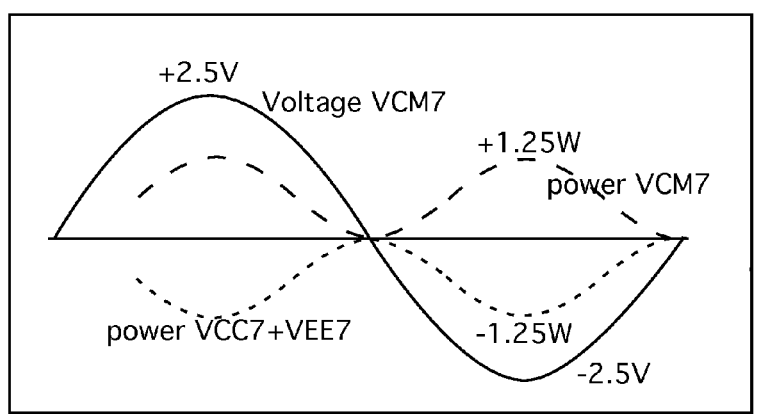
FIG. 8 illustrates the voltage signal waveform of external source VCM7, the power loss waveform of VCM7, and the power harvested waveform at the supply voltages of VCC7 and VEE7.

It is possible to filter the currents across Rp7 and Rn7 and RL7 to monitor the power waveforms of VCC7, VEE7, and VCM7. FIG. 8 shows a 50 Hz waveform for VCM7, and the power waveforms of VCM7 and VCC7+VEE7 along side. Using VCM7 as a power source, a +/−2.5 volt swing across VCM7 draws from its swing the power from 0 to 1.25 W peak. The power being discharged from VCM7 is that of a 5 Ohms resistor. This same power waveform appears in the opposite polarity by the discharge powers of VCC7 and VEE7. So while it looks like VCM7 is seeing a 5 Ohm resistor, and is dissipating the expected amount of power, that power is really being ending up in both the VCC7 and VEE7 supplies.

Figure 9:
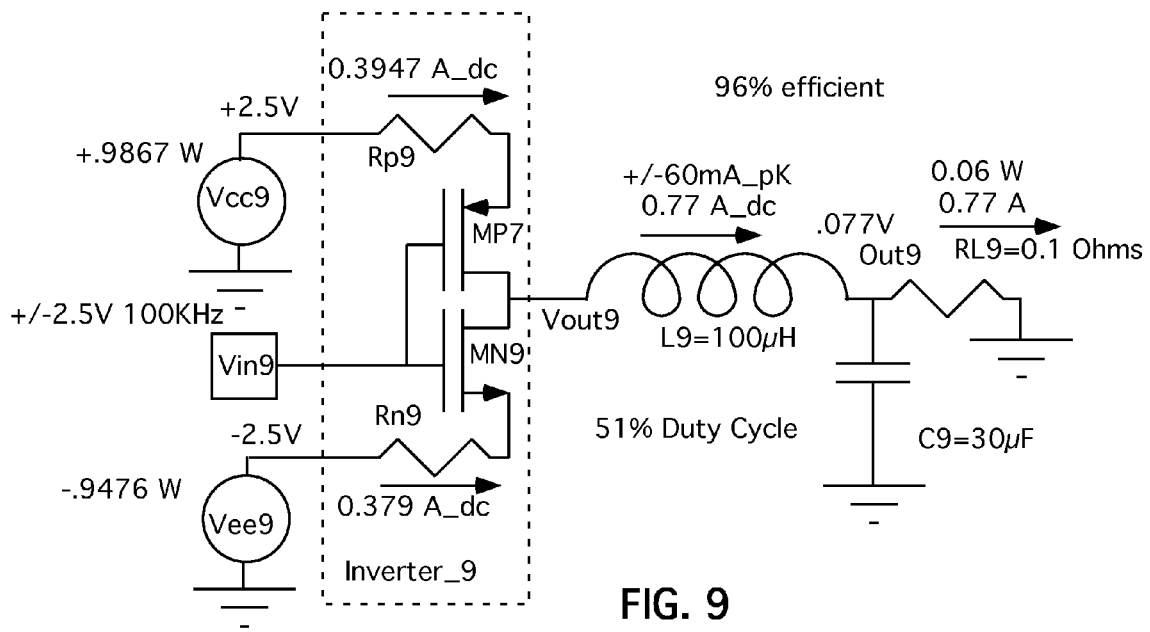
FIG. 9 illustrates the circuit of FIG. 2 being used to transferring energy from VCC9 to VEE9, by using a low value for RL9, and by increasing the duty cycle to 51%.

FIG. 8 shows that power is being transferred on a continuous basis. It does not depend on magnitude or polarity. But there is one potential problem. FIG. 5 shows that if the VCM5 power source is a DC 5 volts, then while VCC is getting charged, VEE5 is getting discharged. That can't go on forever. Asymmetrical power transfer between VCC5 and VEE5 is an issue which needs to be addressed. FIG. 9 shows the invention with one end of resistor RL9 effectively at ground potential, and RL9 has been set to a more typical value of 0.1 Ohms. Offset can be applied to the current measurement such that the duty cycle increases by 1%. Now increasing the duty cycle by 1% will transfer about one watt from VCC9 to VEE9. The draw back is that a DC offset current of 770 mA will be flowing through RL9. If the side of RL9 shown here at ground potential is actually connected to a secondary of a transformer, this DC offset current will not create much of a problem. But some applications may require methods in which the harvesting of energy and the handling of asymmetrical power are done separately.

The method shown in FIG. 9 is not required if the external power source is of a single polarity and the DC to DC converter is running off a single supply as in FIG. 1. If the polarity of the current in FIG. 1 were to be reverse by taking the end of RL1 to an external 5V rather than to ground. Then VCC1 would be harvesting 1.25 Watts. A Single Supply Harvesting Resistor can be made using the same feedback of output current to duty cycle. But a need for the AC version of an Energy Harvesting Resistor may be more common.

Figure 10:
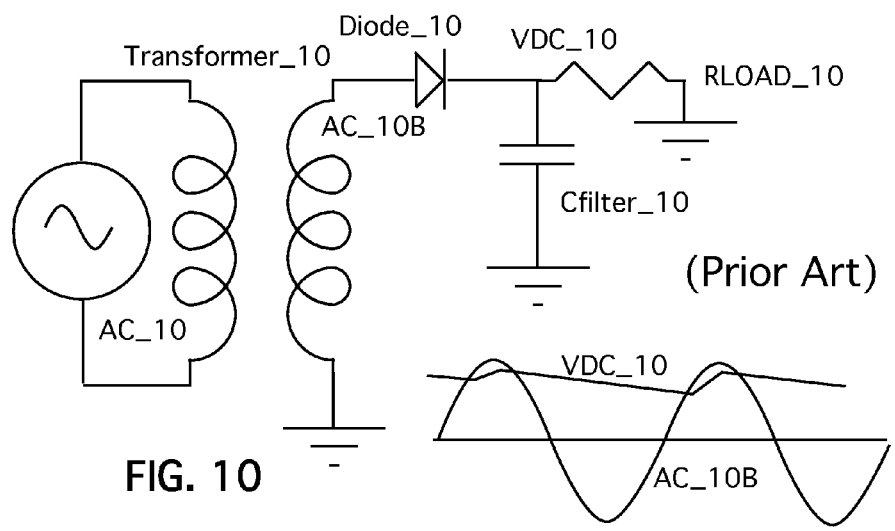
FIG. 10 illustrates a standard AC to DC conversion circuit.

FIG. 10 shows the prior art as using Diode_10, which tend to only draw power from source AC_10B at a very small duty cycle. Diode_10 only turns on when its anode is 0.6V above the voltage across Cfilter_10. It is certainly not harvesting the power of AC_10b at all times. This invention can harvest power in a much different fashion. It doesn't depend on the waveform's shape, magnitude, or polarity. But most important, it is operating linearly. The ability to do linear energy harvesting has some important implications when applied to the mechanical world.

The mapping between the mechanical world and the electronic world is shown in FIG. 11. Inductors are like Mass in that they have a momentum to keep them from changing their current instantaneously. Capacitors are like springs which resist charge by developing voltage. Resistors are like shock absorbers in that they dissipate energy proportional to velocity of charge. In FIG. 11, Shock_Absorber_11 is shown as a metal disk suspended in a viscous fluid. The resistance will be proportional to the metal disk velocity.

The shock absorbers used on an automobile are often chosen to give a critical damping response when combined with the mass of the automobile and the strength of the springs. It is possible to use a magnet, a coil, and a resistor to perform the same function as a shock absorber. If Magnet_12 in FIG. 12 were to move in and out of Coil_12, then the change in magnetic field will produce a voltage across Coil_12. If resistor RL12 across Coil_12 and is small enough in resistance, this will produce a lot of current in Coil_12, which will produce its own opposing magnetic field to resist the movement of Magnet_12.

The higher the speed of movement for Magnet_12, the higher is the resistance to movement. The energy that is put into pushing and pulling Magnet_12 into Coil_12 all gets dissipated as heat in RL_12. In FIG. 11, Shock_Absorber_11 is dissipating the energy of movement in a viscous liquid. In FIG. 12, energy of movement of Magnet_12 is instead being dissipated in resistor RL_12.

This invention efficiently harvests energy as a linear resistor. Shock_Absorber_11 of FIG. 11 could be replaced to the electrical version of FIG. 12, and then resister RL_12 could be replaced by an Energy Harvesting Resistor. The equivalent resistance would need to be adjusted to critically dampen Mass_11 and Spring_11. But the result would be that any energy that gets dissipated as heat in Shock_Absorber_11 could instead be harvested. So shock absorbs could be converted into generators.

It is common practice to model power sources in electronics as equivalent voltage sources having an equivalent output impedance. The maximum energy that can be derived from a power source is when the load impedances matches the output impedance. When a harvesting resistor such as RLOAD_13 as shown in FIG. 13 is applied to power source V_equivalent_13, it is very easy to adjust the impedance of RLOAD_13 to match R_equivalent_13. A 1% change in duty cycle changes the output voltage by 1% of the supply voltage. Setting that 1% change to corresponds to a change in current at the output give the desired impedance. But there are more important applications to matching resistance.

Every media that can carry a wave does so with a characteristic impedance. For sound, the mass of air plays the roll of the inductor and compression of the air the capacitor. For a ribbon of steel, there is mass and springiness. For ocean waves, there is mass and gravity, etc. When a wave in a swimming pool hits a wall, it gets reflected. If ocean waves could be terminated with something that matches their characteristic impedance, the termination can absorbs all the energy of the waves without reflection.

Consider the pipe carrying the exhaust of an automobile engine. The mass and springiness of the pipe can be modeled as the inductors and capacitors forming a transmission line in FIG. 14. The sound wave traveling within the metal of the pipe is seeing a mechanical transmission line. A proper impedance size of Rmatch_14 can capture all Waveform_14's energy without a reflection. Now if Rmatch_14 happens to be the circuit of FIG. 12 which is using an Energy Harvesting Resistor for RL_12, then perhaps a muffler could be turned into an electrical power generator.

While the invention has been shown in this particular embodiment, it will be understood by those skilled in the art, that different methods for DC to DC conversion, and different methods of sensing current, and different methods to adjust duty cycle, can be substituted, as long as the end result generates a voltage to current relationship of a simple resistor, and as long as the intention of is to harvest energy from an external power source as an equivalent resistor. All of these substitutions can all be made with out departing from the spirit and scope of the invention.

What is claimed is:

1. An energy harvesting resistor comprising:

a reverse connected dc to dc converter composed of, a set of single or dual power supplies, a means of duty cycle modulation, a switchable output node, a set of switching devices to alternatively connect said set of single or dual power supplies to said switchable output node, an energy storing inductor connected between said switchable output node and a voltage smoothing node, a voltage smoothing capacitor connected between said voltage smoothing node and a ground node, a current sensing resistor connected between said voltage smoothing node and an external voltage source; and a means of sensing a current flow across said current sensing resistor; and a means of coupling signal from said current flow to said means of duty cycle modulation to control said set of switching devices to define said voltage smoothing node to have a voltage proportional relation to said current flow; such that said voltage smoothing node is acting as a power absorbing node where energy from said external voltage source is coupled though said current sensing resistor, through said energy storing inductor, to said set of single or dual powers supplies while maintaining a voltage to current to power relation of a linear resistor with respect to the said external voltage source.

2. An energy harvesting resistor comprising:

a set of single or dual power supplies, a ground node, a lowpass filtered node, a power input port, an inductor, a capacitor, a current sense resistor; and a pulse width modulator circuit composed of a voltage modulating input port and a percent modulated voltage output port; and a CMOS inverter connected across said set of single or dual power supplies having an inverter input port and an inverter output port; and having said inverter input port connected to said percent modulated voltage output port; and having said inductor connected between said inverter output port and said lowpass filtered node; and having said capacitor connected between said lowpass filtered node and said ground node; and having said current sense resistor connected between said lowpass filtered node and said power input port; and a means of sensing output current flowing across said current sense resistor as a current flow; and a means of signal coupling said current flow to said voltage modulating input port of said pulse width modulator circuit; and a means of coupling said percent modulated voltage output port to said inverter input port to control the switching in the said CMOS inverter; such that an average voltage which is scaled to said current flow is coupled through said inductor to said lowpass filtered node, thereby creating a voltage to current to power relationship of a linear resistor at the said lowpass filtered node, and energy from said power input port is coupled though said current sense resistor through said inductor and on to said set of single or dual power supplies, while maintaining the said voltage to current to power relationship of a linear resistor with respect to the said power input port.

3. An energy harvesting resistor comprising:

a positive VCC voltage source having a negative node connected to a ground node, a negative VEE voltage source having a positive node connected to said ground node, an external voltage power source having a single node connected to said ground node; and a lowpass filtered node, an inductor, a capacitor, a current sense resistor; and a pulse width modulator circuit composed of a voltage modulating input port and a percent modulated voltage output port; and a CMOS inverter composed of a PMOS transistor having a PMOS source node connected to said positive VCC voltage source and having a PMOS gate node connected to an inverter input port of said CMOS inverter and having a PMOS drain node connected to an inverter output port of said CMOS inverter, and a NMOS transistor having a NMOS source node connected to said negative VEE voltage source and having a NMOS gate node connected to said inverter input port of said CMOS inverter and having a NMOS drain node connected to said inverter output port of said CMOS inverter; and said inverter input port is connected to said percent modulated voltage output port; and having said inductor connected between said inverter output port and said lowpass filtered node; and having said capacitor connected between said lowpass filtered node and said ground node; and having said current sense resistor connected between said lowpass filtered node and said power input port; and a means of sensing output current flowing across said current sense resistor as a current flow; and a means of signal coupling said current flow to said voltage modulating input port of said pulse width modulator circuit; and a means of coupling said percent modulated voltage output port to said inverter input port to control the switching in the said CMOS inverter; such that an average voltage which is scaled to said current flow is coupled through said inductor to said lowpass filtered node, thereby creating a voltage to current to power relationship of a linear resistor at the said lowpass filtered node, and energy from said external voltage power source is coupled though said current sense resistor through said inductor and on to said positive VCC voltage source and said negative VEE voltage source, while maintaining the said voltage to current to power relationship of a linear resistor with respect to the said external voltage power source.

4. An energy harvesting resistor of claim 3, wherein there is an addition application of a power transfer circuit comprising:

a second pulse width modulator voltage source, and a second CMOS inverter, and a second inductor, and a second capacitor, and a second current sense resistor; and having said percent modulated voltage output port of said second pulse width modulator voltage source connected to said inverter input port of said second CMOS inverter; and having said second inductor connected to said inverter output port of said second CMOS inverter, and to a second lowpass filtered output; and having said second capacitor connected to said second lowpass filtered output node and to said ground node; and having said second current sense resistor connect to said second lowpass filtered output node and to said ground node; such that an application of dc offset to the measurement of the said current flow signal applied to the said voltage modulating input port of said second pulse width modulator voltage source to allow a small percent modulate of the said percent modulated voltage output port of said second pulse width modulator voltage source to be above or below a 50% level, enabling a transfer of energy from said positive VCC voltage source to said negative VEE voltage source, or from said negative VEE voltage source to said positive VCC voltage source respectively.

* * * * *